United States Patent
Morris

(10) Patent No.: US 6,571,260 B1
(45) Date of Patent: May 27, 2003

(54) MEMORY RECLAMATION METHOD

(75) Inventor: Steven Morris, Crawley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/527,198

(22) Filed: Mar. 16, 2000

(30) Foreign Application Priority Data

Mar. 31, 1999 (GB) .............................................. 9907283

(51) Int. Cl.[7] .............................................. G06F 17/30
(52) U.S. Cl. ................................................... 707/206
(58) Field of Search .............................. 707/206, 104.1, 707/205; 705/40; 712/34; 714/9; 717/109

(56) References Cited

U.S. PATENT DOCUMENTS

| | | | | |
|---|---|---|---|---|
| 4,914,586 A | * | 4/1990 | Swinehart et al. | 707/101 |
| 5,241,673 A | * | 8/1993 | Schelvis | 707/103 R |
| 5,577,246 A | * | 11/1996 | Priddy et al. | 707/202 |
| 5,736,664 A | * | 4/1998 | Ito et al. | 84/634 |
| 5,754,938 A | * | 5/1998 | Herz et al. | 725/116 |
| 5,812,134 A | * | 9/1998 | Pooser et al. | 345/848 |
| 5,974,398 A | * | 10/1999 | Hanson et al. | 705/14 |
| 5,974,444 A | * | 10/1999 | Konrad | 709/203 |
| 6,008,847 A | * | 12/1999 | Bauchspies | 375/240.01 |
| 6,029,195 A | * | 2/2000 | Herz | 725/116 |
| 6,049,779 A | * | 4/2000 | Berkson | 705/14 |
| 6,098,080 A | * | 8/2000 | Endicott et al. | 707/206 |
| 6,327,594 B1 | * | 12/2001 | Van Huben et al. | 707/200 |
| 6,332,129 B1 | * | 12/2001 | Walker et al. | 705/26 |
| 6,338,073 B1 | * | 1/2002 | Houldsworth et al. | 707/206 |
| 6,463,432 B1 | * | 10/2002 | Murakawa | 707/5 |

OTHER PUBLICATIONS

"Garbage Collection, Algorithms for Automatic Dynamic Memory Management", R. Jones et al, Pub. John Wiley & Sons Ltd, 1976, pp. 1–18.

"Uniprocessor Garbage Collection Techniques", P.R. Wilson Proc. 1992, Int'l Workshop on Memory Management St. Malo, France, Sep. 1992.

\* cited by examiner

Primary Examiner—Safet Metjahic
Assistant Examiner—Sana Al-Hashemi
(74) Attorney, Agent, or Firm—Russell Gross

(57) ABSTRACT

A method and apparatus for reclaiming memory space allocated to data structures comprising data objects linked by identifying pointers. A repetitious cycle is performed including the following steps of traversing the data structures to identify and mark active data objects, deleting data objects that were marked as garbage during the previous cycle, marking data objects not marked as active as garbage, and executing the finalizer of any data object marked as garbage having a finalizer.

13 Claims, 4 Drawing Sheets

MEMORY RECLAMATION METHOD

BACKGROUND OF THE INVENTION

The present invention relates to a method and apparatus for handling stored data objects and particularly, but not exclusively, to the handling of finalisation for objects in memory compaction and garbage collection procedures executing in real time in real or virtual memory space of a data processing apparatus.

Garbage collection is the automated reclamation of system memory space after its last use by a programme. A number of examples of garbage collecting techniques are discussed in "Garbage Collection: Algorithms for Automatic Dynamic Memory Management" by R. Jones et al, pub. John Wiley & Sons 1996, ISBN 0-471-94148-4, at pages 1 to 18. Whilst the storage requirements of many computer programs are simple and predictable, with memory allocation and recovery being handled by the programmer or a compiler, there is a trend toward functional languages having more complex patterns of execution such that the lifetimes of particular data structures can no longer be determined prior to run-time and hence automated reclamation of this storage, as the program runs, is essential.

Finalisation is a concept used in Sun Microsystems' Java 7 and other current garbage-collected languages (with Java being a trade mark of Sun Microsystems) and programming environments, such as Modula-3 and Cedar. Stored data objects created by a program process may no longer be needed at a point during the execution of the program process. Unneeded data objects are detected by the environment's garbage collector and marked as garbage so that the memory occupied by the data object can be reclaimed. A data object may have an associated finaliser which is to be executed after the object is detected as garbage but before the memory occupied by the data object is reclaimed. The purpose of this feature is to allow an object to clean up any other system resources the object has claimed before it is destroyed.

For example, the finaliser for a Java File object would close all the system file handles held by the object.

However, as a finaliser is just a special type of program procedure associated with a data object, with all the power of other program procedures, the finaliser procedure can access and manipulate all data objects accessible from the object being finalised. Therefore, all objects accessible by a finaliser, such as descendant objects accessible from referencing pointers held by the data object, must be explicitly excluded from garbage collection. Furthermore, it is possible for the finaliser method to resurrect any such objects accessible by a finaliser, including the object being finalised itself, by making the object accessible by the program process again. Consequently, a garbage collection procedure cannot delete any objects that are accessible by a finalisable object until its finaliser has executed and the accessibility of the objects has been reevaluated. In Java and other languages, the possibility of an object repeatedly resurrecting itself is typically removed by stating that the finaliser for each instance is executed only once. This control on finalisation will be assumed herein.

In PC's or workstations, the extra processing and memory load to support finalisation is not usually a problem due to the amount of memory typically available in a PC, although the support will, of course, affect the overall efficiency. In low-memory environments such as set-top boxes, however, support for finalisers can cause problems and even a concurrent or incremental garbage collector may have to halt the program until it has executed some or all of the outstanding finalisers and reclaimed any memory used by them.

In a conventional mark-sweep garbage collector a sweep phase is only executed after a mark phase has finished. Therefore only unmarked objects may be safely treated as garbage during the sweep since the mark phase has completely traversed all active data structures. Such collectors cannot immediately be run so the mark phase and sweep phase execute concurrently.

SUMMARY OF THE INVENTION

According to one aspect of the present invention, there is provided a method of reclaiming memory space allocated to data structures comprising data objects linked by identifying pointers, comprising the repetitious cycle of the following steps: traversing the data structures to identify and mark active data objects; deleting data objects that were marked as garbage during the previous cycle; marking data objects not marked as active as garbage; and executing the finaliser of any data object marked as garbage having a finaliser.

The method and apparatus of the present invention permit marking and sweeping to be executed concurrently by explicitly marking garbage objects. By marking objects as garbage on one sweep phase and reclaiming those objects on the next, the deletion of objects is separated completely from the marking phase. Thus memory is reclaimed concurrently with marking live objects, improving the efficiency of garbage collection.

The step of executing the finaliser of any data object marked as garbage having a finaliser may comprise the step of queuing each finaliser to be executed and executing each queued finaliser in turn, and the step of traversing the data structures to identify and mark active data structures may include the step of traversing the data structure of each object having a finaliser queued to be executed and marking it and its descendants as active.

A first mark and a second mark may be used in alternate cycles to mark objects as garbage, wherein data objects having the alternate mark to that used in the current cycle are deleted.

A total of data objects having unexecuted finalisers may be compared to a total of data objects of active data structures having finalisers and, if the totals are equal all objects not marked as active are deleted.

The method and apparatus of the present invention efficiently reclaim memory allocated to garbage and finalisable objects as quickly as possible.

The data structure corresponding to a data object having a finaliser to be queued for execution may be processed to find any other data object of the data structure also having a finaliser queued for execution and, if the other data object is higher in any hierarchy of the data structure, the finaliser is queued for execution after the finaliser for the other data object; otherwise, if the data object is higher in any hierarchy of the data structure than the other data object, the finaliser is queued for execution before the finaliser for the other object.

According to another aspect of the present invention, there is provided a data processing apparatus comprising a data processor coupled with a random access memory containing a data structure comprising data objects linked by identifying pointers, the processor being configured to provide the following in a repetitious cycle for operating on the stored plurality of data objects: means for traversing the data structures to identify and mark active data objects, means for deleting data objects that were marked as garbage during the previous cycle, means for marking data objects not marked as active as garbage, and means for executing the finaliser of any data object marked as garbage having a finaliser.

The means for executing the finaliser of any data object marked as garbage having a finaliser may comprise means for queuing each finaliser to be executed and executing each queued finaliser in turn, and the means for traversing the data structures to identify and mark active data structures may include means for traversing the data structure of each object having a finaliser queued to be executed and marking it and its descendants as active.

The data processing apparatus may include means for obtaining a total of data objects having unexecuted finalisers and means for comparing the total with a total of data objects of active data structures having finalisers and, if the totals are equal deleting all objects not marked as active.

The data processing apparatus may include means for processing the data structure corresponding to a data object having a finaliser to be queued for execution to find any other data object of the data structure also having a finaliser queued for execution and, means for inserting the finaliser in the queue, wherein if the other data object is higher in any hierarchy of the data structure, the finaliser is inserted after the finaliser for the other data object, otherwise, if the data object is higher in any hierarchy of the data structure than the other data object, the finaliser is inserted before the finaliser for the other object.

BRIEF DESCRIPTION OF THE DRAWINGS

The invention will now be described by way of example only, with reference to the accompanying drawings, in which.

DETAILED DESCRIPTION

Figure 1:
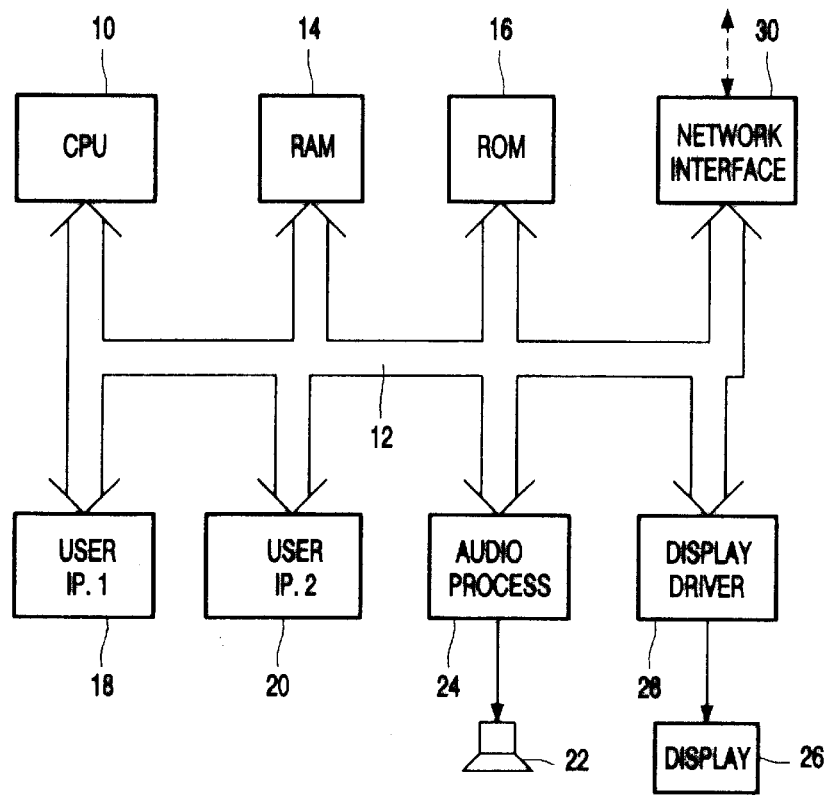
FIG. 1 is a block diagram of a data processing system suitable to embody the present invention.

FIG. 1 represents a data processing system, such as a personal computer, which acts as host for a number of software utilities which may, for example, configure the system as a browser for data defining a virtual environment. The system comprises a central processing unit (CPU) 10 coupled via an address and data bus 12 to random-access (RAM) and read-only (ROM) memories 14, 16. These memories may be comprised of one or several integrated circuit devices and may be augmented by a system hard-disk as well as means to read from additional (removable) memory devices, such as a CD-ROM. Also coupled to the CPU 10 via bus 12 are first and second user input devices 18, 20 which may suitably comprise a keyboard and a cursor control and selection device such as a mouse or trackball. Audio output from the system is via one or more speakers 22 driven by an audio processing stage 24. Video output from the system is presented on display screen 26 driven by display driver stage 28 under control of the CPU 10. A further source of data for the system is via on-line link to remote sites, for example via the Internet, to which end the system is provided with a network interface 30 coupled to the bus 12.

The present invention is particularly embodied in memory management for a working area of the RAM 14 under control of the CPU 10; a controlling program for this may initially be held in ROM 16 and loaded up with the operating system on power-up. The following examples are compliant with concurrent garbage collection and memory management techniques in the Java 7 (Sun Microsystems Inc) virtual machine and the terminology should be construed accordingly: it will be recognised however that the present invention is not restricted to Java-compliant systems, nor to concurrent (or incremental) garbage collection, or to purely virtual memory management.

In the following, a number of particular terms having special meaning will be used, as follows. Root objects are globally accessible stored data objects in systems: in Java, these are represented by static data fields and stacks. Reachable objects are stored data objects connected to the data structures accessible from the root objects of the system. During garbage collection, the marking process should find all reachable objects in one garbage collection cycle. Non-reachable objects are those stored data objects not connected to the data structures, they are inaccessible to running programs and are hence candidates for garbage collection.

Finalisable objects are data objects which have nominally become garbage as they are non-reachable, but which also have a non-empty finaliser that has not yet been executed. A finaliser may only be executed once, so an object is considered finalisable if its finaliser has not yet been executed by the garbage collector. Finaliser-reachable objects are a subset of the group of non-reachable objects which are reachable via pointers from finalisable objects: these objects should not be garbage collected as they may be resurrected or otherwise modified by the finaliser.

Mutator threads are threads of execution in an incremental garbage collection system: the name comes from their effect of mutating the heap memory holding the stored data objects concurrently with the garbage collection threads, whilst a garbage collection thread is a dedicated system thread whose purpose is to collect garbage objects and create more free space in the heap. A finaliser thread is a dedicated system thread which will run finalisation code for unreachable objects with finalisers.

The detection period is the time period between the last reference to an object being removed and its detection as an unreachable object. In mark-sweep collectors this is determined by the duration of the marking cycle. The reclamation period is the time between an object being detected as non-reachable and the point at which it is deleted. In mark-sweep garbage collectors, this is determined by the duration of the sweep cycle and the presence of finalisable objects.

By way of illustration, it will be useful to first consider a commonly used technique for finalising garbage collection, used for example in the Sun Java Virtual Machine v1.0.2. The typical non-finalising garbage collection cycle can be described independently of implementation details as firstly the partition of the heap into reachable and non-reachable sets of data objects, followed by garbage collection of the non-reachable set. Finalisation complicates garbage collection by adding a new stage to each garbage collection cycle, such as to comprise partition of the heap into reachable and non-reachable sets, as before; followed by partition of the non-reachable set into garbage and finaliser-reachable sets;

and finally garbage collection on the garbage set and finaliser execution on the finaliser-reachable set.

This lengthening of the cycle means that the lag between objects becoming non-reachable and their collection is made greater, with the consequence that a larger proportion of the heap is used up by garbage objects and therefore a smaller area of the heap is available for new data items. Also, the strong dependencies between the stages in the cycles mean that most implementations will have poor concurrency characteristics, with large pauses in the mutator threads as the garbage collection algorithm proceeds. Considering that the number of finalisable objects in a typical system is a small percentage of the set of active objects, the added overhead of finaliser support is disproportionately large. The state of each object in the system is identified by two variables M and F, where M may be Marked (including any other mark states) or Unmarked, and F can indicate Finaliser or No Finaliser. An object having variable M=Marked is reachable and has been found by the marking process whilst M=Unmarked indicates that the object has not yet been found to be reachable.

Figure 2:
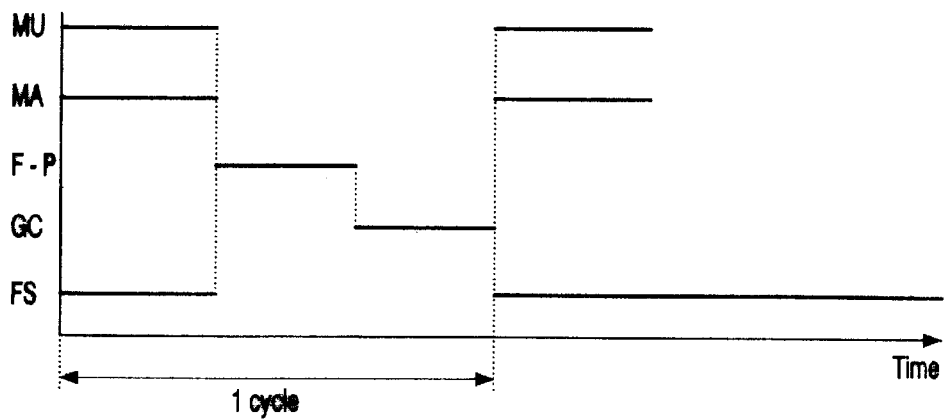
FIG. 2 represents the concurrency of marking and sweeping operations in prior art garbage collection systems.

The separate tasks relevant to the garbage collector and their interaction in the simple system are shown in FIG. 2. The mutator threads MU may create new objects in the heap at any time. The marking stage MA involves the tracing of objects from root objects. Objects found by this tracing have M=Marked, and marking can be performed in the garbage collection thread or, in the illustrated case of incremental garbage collection, in the mutator threads. The finaliser partitioning F-P involves sweeping over the heap, placing objects with M=Unmarked and F=Finaliser in a queue, then a mark phase using finalisable objects as roots: this runs in the garbage collection GC thread. The finalisation stage FS involves the execution of finalisers in the queue, and sets F=No Finaliser for objects after execution. This may run in the garbage collection GC thread or, as shown, in a dedicated finaliser thread FS.

This technique has some poor characteristics, the first of which is poor concurrency with the steps of mark phase MA, finaliser partition F-P, and garbage collection sweep GC occurring serially. Consequently, the inherent independence between the tasks cannot be exploited in a multi-threaded system. Another problem is the generally long reclamation times for all objects. For non-finaliser-reachable garbage (which will be the vast majority), no garbage will be collected in this cycle until the finaliser partition F-P is completed. This is wasteful as the objects will have been examined during the finalisation partition anyway. With incremental garbage collection algorithms, the system pause for mutators whilst finaliser partition F-P and the garbage collection GC sweep occur is unacceptably long, taking up two complete sweeps over the heap plus the finaliser-reachable marking phase.

Figure 3:
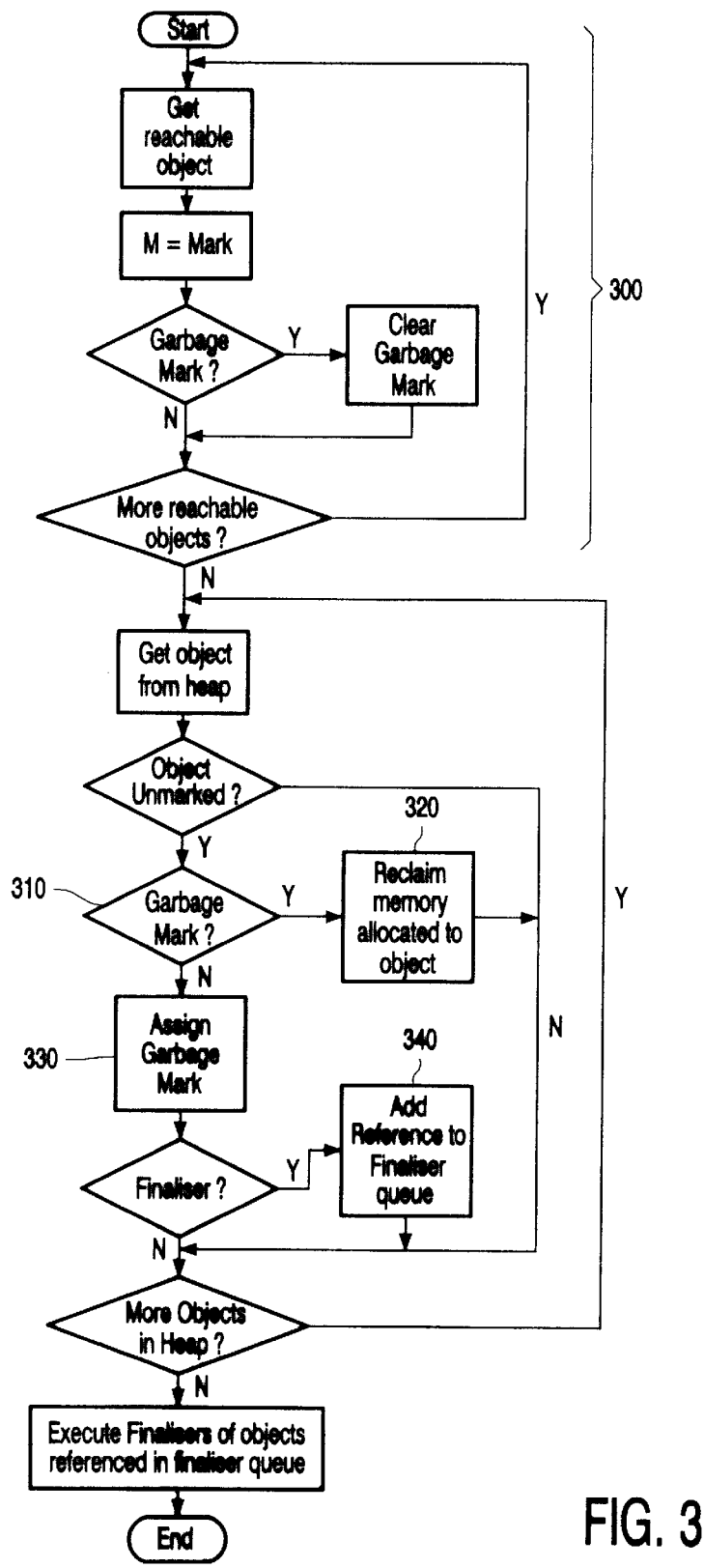
FIG. 3 is a flow chart of a memory reclamation method according to an embodiment of the present invention.

FIG. 3 is a flow chart of a memory reclamation method according to an embodiment of the present invention. A garbage mark variable (G) is associated with each object. Initially no value is attributed to the variable, which is set when the respective object is identified as unreachable. A marking stage identifying and marking reachable objects is performed in step 300 using a technique such as those techniques discussed or referred to above. A sweep stage is then performed on the memory heap. Unmarked objects (i.e. those not reached in marking stage 300) are checked for an already existing garbage mark in step 310. If a garbage mark is found, the object is deleted in step 320. If no existing garbage mark is found, the object is assigned a garbage mark in step 330. If the finaliser variable associated with the object indicates it has an unexecuted finaliser, a reference to the object is added to the finaliser queue in step 340. The sweep stage comprises the assigning of garbage marks to unmarked objects, the deletion of data objects with existing garbage marks and the execution (or scheduling for execution) of finalisers. The marking stage includes the traversing of all objects reachable from root objects and marking them. For the purposes of the marking stage, any objects having an executing finaliser, or a finaliser scheduled for execution, is treated as a root object and therefore the object and its descendants are prevented from being reclaimed until the finaliser has finished its execution.

Steps 310–340 are repeated for each unmarked object in the memory heap. Once all of the heap has been processed, the finaliser for each object referenced in the finaliser queue is executed in step 350. This cycle thereby reclaims memory space allocated to those objects that had a garbage mark assigned during the previous cycle, and which remained as garbage even after execution (or scheduling of execution) of the finalisers during the previous cycle. The finaliser execution may have the effect of resurrecting the referenced object and/or any of its reachable descendants. A resurrected object would then be reachable from a root object. Once the finaliser has been executed, its reference is removed from the finaliser queue and the F variable of the object is set to F=No Finaliser.

During the next mark stage, any object having a garbage mark found to be reachable from a root object (as a result of finaliser execution) has its garbage mark cleared in addition to being marked. Preferably, finalising objects, objects scheduled to be finalised and their descendants that are treated as root objects for the purpose of the mark stage do not have their garbage mark cleared so that they are reclaimed as soon as the execution of the finaliser has completed.

In the subsequent sweep stage all unmarked objects having a garbage mark, i.e. the garbage identified during the previous mark-sweep but not resurrected by a finaliser, can be immediately deleted, as explained above.

An embodiment will now be described as an enhancement to the method described above with reference to FIG. 3, the embodiment providing a means for reliably detecting whether newly unmarked objects can safely be deleted (i.e. without waiting for the next mark-sweep cycle). This procedure is performed by tracking the number of objects with finalisers that have been found during marking, and comparing with a known and stored total allocated in the heap. As the finalisation queue is included in the marking process, the only finalisable objects not located during marking are those that have become non-reachable during the previous collection cycle. When not all finalisable objects have been located in the previous mark phase, then there is a non-empty set of finaliser-reachable objects to identify in the sweep. However, when all finalisables are accounted for, all unmarked objects are known to be garbage, and can be deleted immediately.

The object states are as for the FIG. 3 example, but with three new global variables added:

finaliser_count A count of the total number of finalisable objects in the heap found_count The number of objects with finalisers located during the mark process shortcut A flag indicating how the sweep process should behave this cycle.

Figure 4:
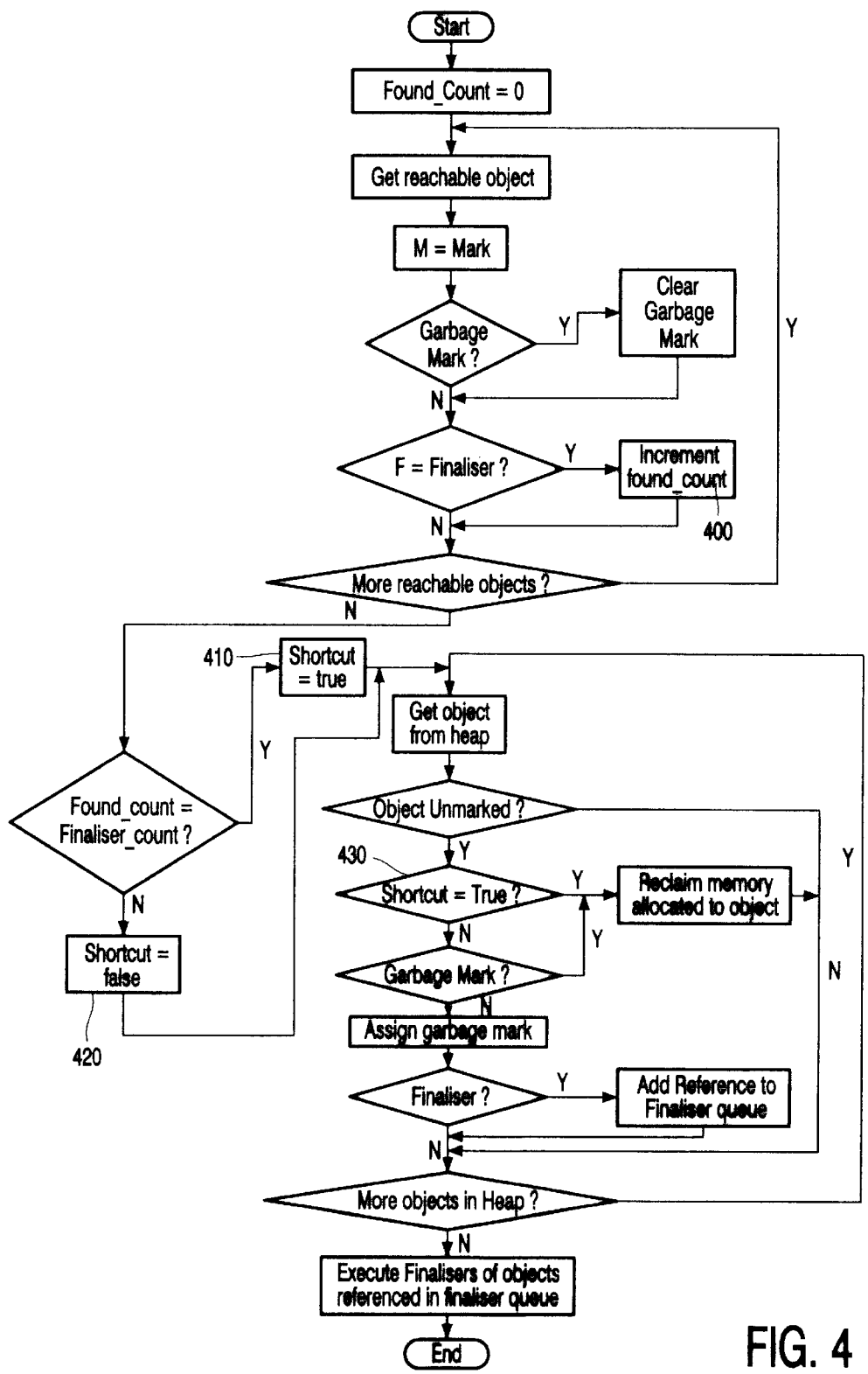
FIG. 4 is a flow chart of a memory reclamation method according to another embodiment of the present invention.

The tasks are carried out generally as for the FIG. 3 example, but with some exceptions as illustrated by the flow chart FIG. 4. In the case of the mutators, if a new object created has F=Finaliser then finaliser_count is incremented. During marking, if a found object has F=Finaliser, then found_count is incremented in step 400. If, after all reachable objects have been marked, found_count=finaliser_count then no finalisable objects have become garbage this cycle and all unmarked objects can be safely deleted. The shortcut variable is set to True to signify this in step 410. Otherwise, the shortcut variable is set to False to signify that at least there is one newly finalisable object to be processed this cycle and no newly unmarked objects should be deleted.

During sweeping, if the variable "shortcut" is true, then unmarked objects are deleted at step 430; if "shortcut" is false, then any unmarked objects are processed as has previously been discussed with reference to FIG. 3. Finalising is handled as before but, after running the finaliser thread for an object, F is set to No Finaliser, the object is marked, and both found_count and finaliser_count are decremented.

When the technique is applied to an incremental garbage collector as described, the finaliser_count may change during the marking traversal. To make the counts consistent, the found_count must not include any objects found during the mark traversal or the comparison will yield the wrong result. In order to avoid this, during traversal found_count may have 1 subtracted if a marked finalisable object is encountered. Alternately, a second ongoing count processed_count may be maintained to record the number of marked finalisers encountered during a sweep, with processed_count being deleted from found_count before comparison with finaliser_count.

FIG. 4 shows this optimised finalisation model with additional reclamation through use of the "shortcut" variable: as will be recognised, in comparison with the FIG. 3 technique, that of FIG. 4 guarantees 1-cycle reclamation when no finalisers are used and a maximum of 2-cycle reclamation for all non-finaliser-reachable data objects.

One variation to the methods presented above is to mark finalisers and their descendants as live during the sweep phase rather than waiting until the next mark phase. In this way it is possible to tell exactly which objects are garbage at the end of the sweep phase rather than having to wait until the end of the next mark phase. This would be of benefit if the mark and sweep phases were executed concurrently.

In the generally rare event that a data structure containing more than one finalisable object becomes non-reachable, the number of finalisables detected this cycle becomes uncertain due to a race condition between the marking process and the progress of the sweep. For example, assume an object F1 is found by the sweep, added to the finalisation queue, and marked: F1 references another finalisable object F2, which is also non-reachable in this cycle. Depending on the behaviour of the marking algorithm, F2 may be reached by the marker before or after the sweep in the next cycle reaches it. F2 is only added to the finalisation list this cycle if the sweeper reaches it first. A possible solution is to place objects on the finalising queue as they are marked, such that the same actions will be taken for an object regardless of whether it is found by the sweep or marking process.

An aggressive marking algorithm will tend to prevent lower finalisables in a connected data structure from entering the queue during the same cycle as the top levels of the structure, leading to a semi-topological ordering of finalisers. This typically aids recycling rates as higher objects in a data structure will have a larger reachable set than lower terms, and will therefore tend to make more objects unreachable on deletion.

Conversely, marking of finalisables located during the sweep may be delayed until the sweep completes, such that all newly non-reachable finalisables will be added to the finalisation queue. This aids predictability, and permits a strengthening of the reclamation period definitions: 1-cycle reclamation is guaranteed when no non-reachable finalisable objects are detected in the previous marking phase.

Figure 5:
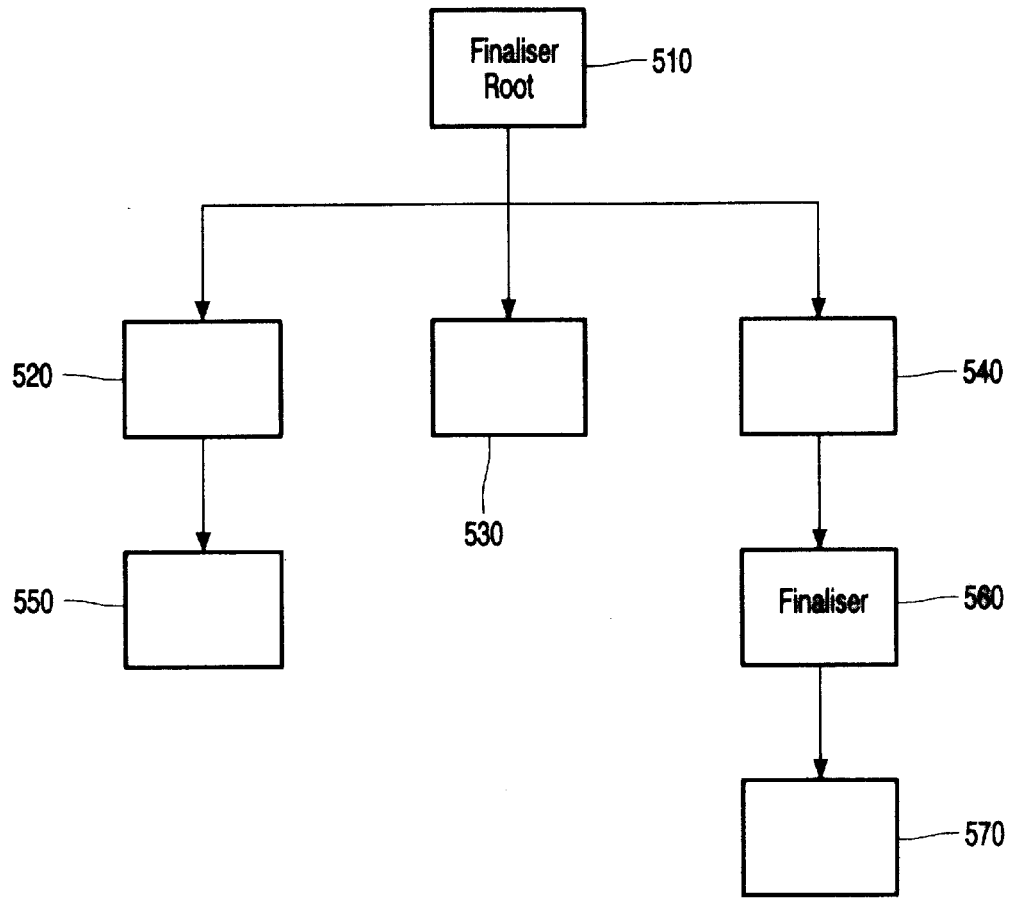
FIG. 5 represents a finalisable data structure.

FIG. 5 represents a finalisable data structure to be processed by a further enhancement of the method described with reference to FIGS. 3 and 4, in which the execution of finalisers of objects referenced in the finaliser queue in step 350 is ordered.

The data structure 500 of FIG. 5 comprises a number of data objects (510–570) linked by referencing pointers. Data objects 510, 550 and 560 have finaliser methods associated with them. At a point during the execution of a program process, the data structure is no longer needed and becomes unreachable. Due to the fact that the memory heap holding the data objects is not ordered, the order in which the sweep finds the data objects is unpredictable. Supposing that data object 560 is found before 510, the order of the finaliser queue will be 560, 510 and 550. This order is not desirable as data object 560 is reachable from the finaliser of data object 510 and could therefore be resurrected during the execution of the finaliser for data object 510, negating the need to execute its own finaliser.

Therefore, once all objects have been processed by the sweep, the finaliser queue is ordered to provide a topological execution of finalisers. A breadth-first search is performed by following the pointers from each object referenced in the finaliser queue to its descendants. If a data object referenced earlier in the finaliser queue is found to be reachable from another data object referenced in the queue, the queue is re-ordered so that data object will have its finaliser executed before its descendant.

In this manner, the queue of finalisers for FIG. 5 would be re-ordered to 510, 560 and 550.

The ordering of finalisable data objects referenced in the finaliser queue could alternatively be done as references to data objects are added to the queue, searching the queue to determine where to insert the reference.

In the embodiments described above, a binary state variable (G) is used to identify garbage. However, a multistate variable could preferably be used. For example, states A and B may be used, both signifying objects which are garbage. On one sweep phase, garbage is marked with State A, but is not deleted. At the end of the sweep phase any finalisers of finalisable objects are executed. On the next sweep phase, State B is used to mark garbage. On marking an object with State B, if it already has a State A mark it can safely be deleted as it is still garbage and has not been resurrected by a finaliser.

Although defined principally in terms of a software browser implementation, the skilled reader will be well aware than many of the above-described functional features could equally well be implemented in hardware or a combination of hardware and software.

From reading the present disclosure, other modifications will be apparent to persons skilled in the art. Such modifications may involve other features which are already known in the design, manufacture and use of data processing and/or data network access apparatus and devices and component parts thereof and which may be used instead of or in addition to features already described herein.

What is claimed is:

1. A method of reclaiming memory space allocated to data structures comprising data objects linked by identifying pointers, comprising the repetitious cycle of the following steps: traversing the data structures to identify and mark active data objects; deleting data objects that were marked as garbage during the previous cycle; marking data objects not marked as active as garbage; and executing the finaliser of any data object marked as garbage having a finaliser.

2. A method as claimed in claim 1, wherein the step of executing the finaliser of any data object marked as garbage having a finaliser comprises the step of queuing each finaliser to be executed and executing each queued finaliser in turn, and wherein the step of traversing the data structures to identify and mark active data structures includes the step of traversing the data structure of each object having a finaliser queued to be executed and marking it and its descendants as active.

3. A method as claimed in claim 1, wherein a first mark and a second mark are used in alternate cycles to mark objects as garbage, wherein data objects having the alternate mark to that used in the current cycle are deleted.

4. A method as claimed in claim 1, wherein a total of data objects having unexecuted finalisers is compared to a total of data objects of active data structures having finalisers and, if the totals are equal all objects not marked as active are deleted.

5. A method as claimed in claim 2, wherein the data structure corresponding to a data object having a finaliser to be queued for execution is processed to find any other data object of the data structure also having a finaliser queued for execution and, if the other data object is higher in any hierarchy of the data structure, the finaliser is queued for execution after the finaliser for the other data object, otherwise, if the data object is higher in any hierarchy of the data structure than the other data object, the finaliser is queued for execution before the finaliser for the other object.

6. A method as claimed in claim 2, wherein a first mark and a second mark are used in alternate cycles to mark objects as garbage, wherein data objects having the alternate mark to that used in the current cycle are deleted.

7. A method as claimed in claim 6, wherein a total of data objects having unexecuted finalisers is compared to a total of data objects of active data structures having finalisers and, if the totals are equal all objects not marked as active are deleted.

8. A data processing apparatus comprising a data processor coupled with a random access memory containing a data structure comprising data objects linked by identifying pointers, the processor being configured to provide the following in a repetitious cycle for operating on the stored plurality of data objects:

means for traversing the data structures to identify and mark active data objects;

means for deleting data objects that were marked as garbage during the previous cycle;

means for marking data objects not marked as active as garbage; and means for executing the finaliser of any data object marked as garbage having a finaliser.

9. A data processing apparatus as claimed in claim 8, wherein the means for executing the finaliser of any data object marked as garbage having a finaliser comprises means for queuing each finaliser to be executed and executing each queued finaliser in turn, and wherein the means for traversing the data structures to identify and mark active data structures includes means for traversing the data structure of each object having a finaliser queued to be executed and marking it and its descendants as active.

10. A data processing apparatus as claimed in claim 8, wherein a first mark and a second mark are used in alternate cycles to mark objects as garbage, wherein data objects having the alternate mark to that used in the current cycle are deleted.

11. A data processing apparatus as claimed in claim 8, including means for obtaining a total of data objects having unexecuted finalisers and means for comparing the total with a total of data objects of active data structures having finalisers and, if the totals are equal deleting all objects not marked as active.

12. A data processing apparatus as claimed in claim 9, including means for processing the data structure corresponding to a data object having a finaliser to be queued for execution to find any other data object of the data structure also having a finaliser queued for execution and, means for inserting the finaliser in the queue, wherein if the other data object is higher in any hierarchy of the data structure, the finaliser is inserted after the finaliser for the other data object, otherwise, if the data object is higher in any hierarchy of the data structure than the other data object, the finaliser is inserted before the finaliser for the other object.

13. A program storage device readable by a machine and encoding one or more programs of instructions for executing the method steps of claim 1.

\* \* \* \* \*